Patented Mar. 20, 1923.

1,449,109

UNITED STATES PATENT OFFICE.

FRIEDRICH HAYDUCK, OF WILMERSDORF, GERMANY, ASSIGNOR TO THE FLEISCH-MANN COMPANY, OF NEW YORK, N. Y., A CORPORATION OF OHIO.

LOW-ALCOHOL YEAST PROCESS.

No Drawing. Application filed October 30, 1920. Serial No. 420,836.

(GRANTED UNDER THE PROVISIONS OF THE ACT OF MARCH 3, 1921, 41 STAT. L., 1313.)

*To all whom it may concern:*

Be it known that I, FRIEDRICH HAYDUCK, a citizen of Germany, residing at Wilmersdorf, Germany, have invented certain new and useful Improvements in Low-Alcohol Yeast Processes (for which application for patent was filed in Germany April 23, 1915, Patent No. 304,243), of which the following is a specification.

This invention relates to a process for the manufacture of yeast, and particularly to a process for manufacturing a compressed bakers' yeast in which very little alcohol is produced as a by-product and has for its object an improved procedure for manufacturing yeast in a more convenient and economical manner than heretofore.

In accordance with the process described in my German Patent 303.222, and in my corresponding application for United States Patent, Serial No. 420,833, filed October 30, 1920, a particularly high yeast yield is obtained, at the expense of the production of alcohol by a process in which nutrient solutions, which have been produced from sugar or sugar-containing substances and yeast-nutrient inorganic salts are added so gradually during the yeast propagation or growth that the yeast can immediately assimilate the nutrients which may be present together with substantially all of the alcohol which may be formed, under constant aeration.

In the preferred embodiment of my invention described and claimed in my aforesaid application, Serial No. 420,833, the seed yeast is added either to water or to a very dilute nutrient solution and there is gradually and substantially continuously added a relatively concentrated solution of yeast-nutrient materials, as for example, 10% of sugar together with a proportionate amount of suitable inorganic yeast nutrient salts which may be as high as up to one-half of the amount of sugar. Such solutions may have the following proportions:

Sugar 100 parts, ammonium sulphate 40 parts, acid potassium phosphate 9 parts, magnesium sulphate 1 part, calcium carbonate for neutralization about 30 parts and sufficient water to form a solution containing about 10% of sugar; or Molasses (containing about 50% sugar) 100 parts, ammonium sulphate 10 parts, Superphosphate (having 18% water soluble phosphoric acid) 10 parts, magnesium sulphate 0.5 parts, calcium carbonate about 4 parts and sufficient water to form a solution containing about 10% sugar.

In the above process I have further discovered that it is necessary for obtainment of otherwise unobtainable high yields of yeast to neutralize or bind the acid components set free from the inorganic salts by the yeast by the addition of alkalies or alkaline salts. The acid components, which are here set free and must be neutralized, represent in regard to the manufacture of yeast, as I have discovered, a largely harmful ballast.

As I have further discovered, a distinct industrial advantage is obtained if it is possible to use the alkalies themselves for the growth of yeast. In this case not only is there a conservation, at least in part, of the acids which are commercially required for the production of such nutrient salts as are used in the process of my aforesaid co-pending application Serial No. 420,833, but also there is an economizing of the alkalies which are commercially used to neutralize the said acids in the manufacture of the salts, and which in my process are required to neutralize the continuously liberated acid components in the manufacture of yeast. As is also apparent from my German Patent No. 304,242, and my corresponding application for United States patent, Serial No. 420,837, filed October 30, 1920, such a process can be carried out with suitable free alkalies in an assuredly successful manner.

I have now found that such a process in regard to the use of alkalies or salts having an alkaline reaction can be carried out most effectively, if a small quantity of such inorganic nutrient salts are added at the very beginning to that portion of the nutrient solution to which is added the pitch or seed yeast, and from which the yeast in the process of utilization of certain portions of the salts sets free acid ions. In this case the added alkalies neutralize and are in turn neutralized by the acid so produced, thereby making the nutrient solution safe for the yeast.

The process for example is carried out in the following manner: The nutrients required for the yeast (sugar and inorganic salts but exclusive of ammonium salts or other source of inorganic nitrogen) are first dissolved in water to form a solution containing approximately 10% of sugar material. A part of this solution, after being properly diluted with water, in general accordance with the process of my aforesaid copending application Serial No. 420,833 (modified as particularly described in the present application i. e., by the omission of the ammonium salts and substance having an alkaline reaction) is mixed with some ammonium sulphate and set on with seed yeast. The remainder of the nitrogenous substance required for supplying necessary yeast assimilable nitrogen for the yeast, is added in the form of free ammonia (ammonia water), to the relatively concentrated nutrient solution, which is gradually and substantially continuously added to the more dilute nutrient solution during propagation of the yeast. The addition is regulated preferably so that the ammonia can always be neutralized to full extent by the acids set free by the yeast. With such regulation a condition of not more than a limited acidity, which is adapted for the yeast growth is maintained in the solution wherein the yeast is grown.

The process of adding ammonium salts to mashes or worts for the nourishment of the yeast, and of neutralizing the lactic acid formed by lactic fermentation in mashes prior to the fermentation by the yeast, by means of alkalies, especially ammonia, is known. See, for example the United States patent to Alfred Pollak, No. 1,123,920, issued January 5, 1915. In contrast to this, the process of my present application has for its object and comprises in its specific embodiment particularly the addition of alkalies or salts having an alkaline reaction to the nutrient as yeast nourishment, for the production of a high yield of yeast of good quality and in this process one and the same quantity of inorganic acids (repeatedly neutralized and reliberated from their salts during the yeast propagation or growth) constantly neutralizes the added free alkalies or salts having an alkaline reaction as they are gradually added with the concentrated wort. The alkaline substance thus gradually added is, as above described, preferably a substance such as ammonia or ammonia water which not only serves to neutralize acidity developed from the selective partial utilization of the inorganic yeast nutrient salts present but also serves to supply yeast-assimilable nitrogen requisite for the production of large yields of yeast of good quality.

The quantity of ammonium sulfate which, as above described, is suitably employed in preparing the nutrient solution may be such a quantity as is proportionate to the other inorganic salts which are at the time of its introduction present in the relatively dilute solution in which the yeast growth is taking place or is to take place. That is to say, if, for example, the yeast growth is started in a solution containing 1% of sugar (as described in my above-mentioned copending application Serial No. 420,833 on which the invention of my present application is in part based), a proportionate quantity of ammonium sulfate may suitably be used approximating one-fifth to four-tenths this amount of sugar (in accord with the exemplary formulas hereinbefore given) in which case the yeast-nutrient solution would contain initially 0.2% to 0.4% ammonium sulfate together with the proportionate quantities of non-nitrogenous yeast-nutrient substances. Thereafter, during the course of yeast propagation, the yeast-nutrient solution is aerated and the nutrients consumed by the yeast are replenished (so gradually as to permit utilization of any alcohol as formed and to prevent any substantial accumulation of alcohol in the nutrient solution) by the addition of a more concentrated solution which may as hereinbefore described contain for example about 10% sugar and proportionate amounts of the other yeast-nutrient salts. The procedure of my present invention, which discloses the progressive addition of an antacid substance supplying yeast assimilable nitrogen (e. g., ammonia water) to a dilute wort containing a salt or salts from which, during the period of propagation, components are liberated which tend to increasingly acidify the solution in which the yeast is propagated, differs from that of my copending application Serial No. 420,833, which shows the progressive addition of an acid-liberating nitrogen-supplying salt or salts, for example, ammonium sulphate, the deleterious excess of acid being neutralized by non-nitrogenous neutralizing agent. The use of an antacid nitrogenous substance disclosed in the present process serves to prevent deleterious increase of acidity during the yeast production and, as I have discovered, enables high yields of good quality yeast to be obtained, while at the same time effecting a saving in the amount of nutrient salts used.

Since the ammonia water or similar substance having an alkaline reaction and supplying yeast-assimilable nitrogen serves in the present process as the acid-neutralizing agent, it is of course apparent as is pointed out above that the calcium carbonate used in the typical illustrative formulas hereinbefore given and taken from my copending application for United States patent Serial No. 420,833 will not be used as described in my said copending application but that the ammonia water or equivalent substance herein referred to will be used in the manner and for the purposes described.

Having described my invention, what I claim as new and desire to secure by Letters Patent is:—

1. A continuous process of propagating yeast which comprises, initiating propagation of yeast in a dilute nutrient solution containing a compound which is at least partially assimilable by yeast and from which, while being so assimilated, components are liberated which tend increasingly to acidify the nutrient solution, aerating the solution, and adding thereto during the process of propagation yeast nutrient materials, including a sufficient amount of a substance having an alkaline reaction and containing yeast assimilable nitrogen to neutralize substantially all of such acidity.

2. A continuous process of propagating yeast which comprises, initiating propagation of yeast in a dilute nutrient solution containing a compound which is at least partially assimilable by yeast and from which, while being so assimilated, components are liberated which tend increasingly to acidify the nutrient solution, aerating the solution, and adding thereto during the process of propagation yeast nutrient materials, including a substance having an alkaline reaction and containing yeast assimilable nitrogen, at a rate such as to maintain the concentration of the solution substantially constant and to neutralize substantially all of such acidity.

3. A continuous process of propagating yeast with a relatively low yield of alcohol which comprises, initiating propagation of yeast in a highly dilute nutrient solution containing a compound which is at least partially assimilable by yeast and from which, while being so assimilated, components are liberated which tend increasingly to acidify the nutrient solution, aerating the solution, and adding thereto during the process of propagation a more concentrated solution of yeast nutrient materials, including a substance having an alkaline reaction and containing yeast assimilable nitrogen, at a rate such as to maintain a concentration of the solution substantially constant and to neutralize substantially all of such acidity.

4. A continuous process of propagating yeast which comprises, initiating propagation of yeast in a dilute nutrient solution containing a compound which is at least partially assimilable by yeast and from which, while being so assimilated, components are liberated which tend increasingly to acidify the nutrient solution, aerating the solution, and adding thereto during the process of propagation a more concentrated solution of yeast nutrient materials, including a sufficient amount of ammonium hydrate to neutralize substantially all of such acidity.

5. A continuous process of propagating yeast with a relatively low yield of alcohol which comprises, initiating propagation of yeast in a highly dilute nutrient solution containing a compound which is at least partially assimilable by yeast and from which, while being so assimilated, components are liberated which tend increasingly to acidify the nutrient solution, aerating the solution, and adding thereto during the process of propagation a more concentrated solution of yeast nutrient materials including ammonium hydrate, at a rate such as to maintain the concentration of the solution substantially constant and to neutralize substantially all of such acidity.

6. A continuous process of propagating yeast with a relatively low yield of alcohol which comprises, preparing a dilute nutrient solution containing sugar material and an ammonium compound from which yeast may assimilate nitrogen and from which, during such assimilation, components are liberated which tend increasingly to acidify the nutrient solution, initiating propagation of yeast therein with aeration, and substantially continuously adding during the period of propagation a nutrient solution containing sugar material and a compound having an alkaline reaction and containing yeast assimilable nitrogen, at a rate such that the concentration of the aerated solution is maintained approximately constant and substantially all of such acidity is neutralized.

7. A continuous process of propagating yeast with a relatively low yield of alcohol which comprises, preparing a dilute nutrient solution containing sugar material and an ammonium compound from which yeast may assimilate nitrogen and from which, during such assimilation, components are liberated which tend increasingly to acidify the nutrient solution, initiating propagation of yeast therein with aeration, and substantially continuously adding during the period of propagation a nutrient solution containing sugar material and ammonium hydrate, at a rate such that the concentration of the aerated solution is maintained approximately constant and substantially all of such acidity is neutralized.

8. A continuous process of propagating yeast with a relatively low yield of alcohol which comprises, preparing a dilute nutrient solution containing sugar material and an ammonium compound from which yeast may assimilate nitrogen and from which, during such assimilation, components are liberated which tend increasingly to acidify the nutrient solution, initiating propagation of yeast therein with aeration, and substantially continuously adding during the period of propagation a more concentrated nutrient solution containing sugar material and a compound having an alkaline reaction and containing yeast assimilable nitrogen, the addition being made at such a rate, and the relative proportions of the ammonium compound originally present in the dilute solution, the sugar material and the compound having an alkaline reaction, being such, that substantially all of such acidity is neutralized and the concentration of the solution in which the yeast is propagating is maintained approximately constant, whereby practically all alcohol which may be formed is assimilated by the yeast.

In testimony whereof, I have affixed my signature.

FRIEDRICH HAYDUCK.